(No Model.)

F. W. WILDER.
DEVICE FOR PRITCHING UP CATTLE.

No. 440,676. Patented Nov. 18, 1890.

Witnesses:
Harry T. Jones
Albert H. Adams

Inventor:
Fred W. Wilder,
By West & Bond Attys.

UNITED STATES PATENT OFFICE.

FRED W. WILDER, OF CHICAGO, ILLINOIS.

DEVICE FOR PRITCHING UP CATTLE.

SPECIFICATION forming part of Letters Patent No. 440,676, dated November 18, 1890.

Application filed April 28, 1890. Serial No. 349,852. (No model.)

*To all whom it may concern:*

Be it known that I, FRED W. WILDER, residing at Chicago, in the county of Cook, in the State of Illinois, and a citizen of the United States, have invented a new and useful Improvement in Devices for Pritching Up Cattle, of which the following is a specification, reference being had to the accompanying drawings, in which—

Figure 1:
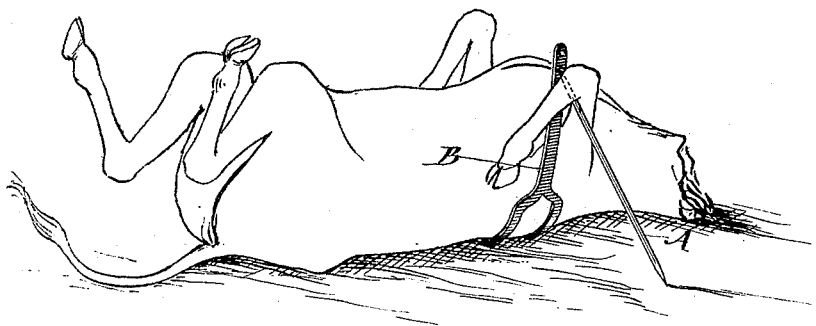
Figure 2:
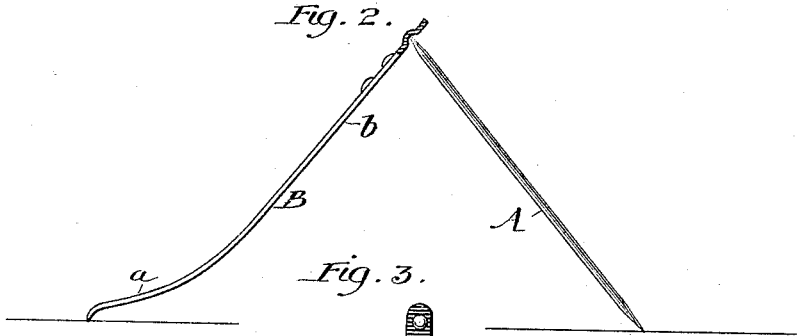
Figure 3:
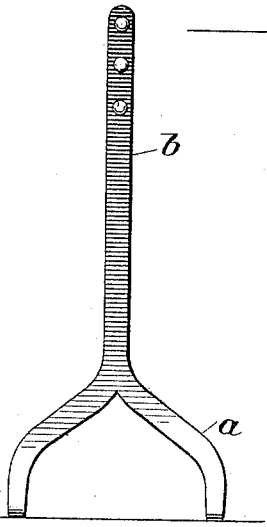

Figure 1 is a perspective view showing the device in use. Fig. 2 is an elevation, and Fig. 3 is a side elevation of the support.

It is the common practice in cattle-slaughtering establishments to turn the animal upon its back for the purpose of opening it and commencing the removal of the hide. To support the animal on its back at such time it has also been the common practice to employ a pritch, which is pointed at both ends, one end being braced against the floor and the other end against the side of the animal in rear of the shoulder. The use of such pritch is very objectionable, because it punches a hole through the hide, thereby injuring the hide and lowering its market value.

The object of this invention is to provide a device for pritching up cattle whereby the animal will be supported in proper position and the above objection avoided. I accomplish this object by the device shown in the drawings and hereinafter described.

That which I claim as new will be pointed out in the claim.

In the drawings, A represents a pritch. B represents a support. The support B consists virtually of two parts—a lower part $a$, adapted to receive the animal, and an upper part $b$, provided with notches adapted to receive the upper end of the pritch A.

The animal, just previous to the time when it is to be pritched up, lies on its side on the floor of the slaughtering-house. The lower end $a$ of the support B is placed near the back of the animal, and the animal is then turned onto its back, thereby turning it onto the lower portion $a$ of the support B. The upper portion of the support B is held in proper position to support the animal by means of the pritch A, which is braced against the floor and in one of the notches in the support B. The animal is turned sufficiently onto the pritch, so that it will have no tendency to turn off from the support B. The form of the lower portion $a$ of the support B may be greatly varied, the essential feature being that it pass sufficiently beneath the animal to firmly hold the support.

By the use of the above device no holes are punched in the hide of the animal.

What I claim as new, and desire to secure by Letters Patent, is—

A device for pritching up cattle, consisting of a pritch and a support adapted to receive the animal and one end of the pritch, substantially as specified.

FRED W. WILDER.

Witnesses:
H. C. GARDNER,
J. A. FABER.